United States Patent [19]
Johansson et al.

[11] Patent Number: 5,533,077
[45] Date of Patent: Jul. 2, 1996

[54] METHOD FOR PREVENTING SCRATCHES ON FUEL RODS DURING FUEL BUNDLE ASSEMBLY

[75] Inventors: Eric B. Johansson, Wrightsville Beach; Edward S. Walker, Wilmington, both of N.C.

[73] Assignee: General Electric Company, Schenectady, N.Y.

[21] Appl. No.: 389,861

[22] Filed: Feb. 22, 1995

Related U.S. Application Data

[63] Continuation of Ser. No. 142,265, Oct. 25, 1993, abandoned.

[51] Int. Cl.⁶ ................................................. G21C 3/32
[52] U.S. Cl. ........................ 376/434; 376/457; 376/415; 376/451
[58] Field of Search .................... 376/457, 415, 376/414, 247, 434, 451; 148/409, 426

[56] References Cited

U.S. PATENT DOCUMENTS

| | | | |
|---|---|---|---|
| 3,531,311 | 9/1970 | Prior | 117/6 |
| 3,757,403 | 9/1973 | Bleiberg | 29/424 |
| 3,826,124 | 7/1974 | Baksay | 72/367 |
| 3,966,550 | 6/1976 | Foulds et al. | 376/442 |
| 4,040,876 | 8/1977 | Bleiberg et al. | 148/37 |
| 4,057,466 | 11/1977 | Thompson | 376/217 |
| 4,071,639 | 1/1978 | Palmer et al. | 427/156 |
| 4,359,349 | 11/1982 | Merrick et al. | 148/12.3 |
| 4,415,530 | 11/1983 | Hunt | 420/453 |
| 4,513,497 | 4/1985 | Finch | 29/727 |
| 4,541,984 | 9/1985 | Palmer | 376/415 |
| 4,557,560 | 12/1985 | Bohannon, Jr. et al. | 350/96.23 |
| 4,572,738 | 2/1986 | Korenko et al. | 74/128 Z |
| 4,608,739 | 9/1986 | Miller | 29/421 R |
| 4,635,333 | 1/1987 | Finch | 29/157.4 |
| 4,689,279 | 8/1987 | Hull et al. | 428/679 |
| 4,740,351 | 4/1988 | Katsumizu et al. | 376/446 |
| 4,800,061 | 1/1989 | Shallenberger et al. | 376/261 |
| 5,028,382 | 7/1991 | King, Jr. et al. | 376/261 |
| 5,069,864 | 12/1991 | Johansson | 376/441 |
| 5,089,221 | 2/1992 | Johansson et al. | 376/442 |

FOREIGN PATENT DOCUMENTS

| | | |
|---|---|---|
| 2041852 | 11/1992 | Canada . |
| 2560423 | 8/1985 | France . |
| 2615028 | 11/1988 | France . |
| 53-011294 | 2/1978 | Japan . |
| 6431095 | 2/1989 | Japan . |
| 1113699 | 5/1989 | Japan . |
| 1-282497A | 11/1989 | Japan . |
| 2168198 | 6/1990 | Japan . |
| 2198397 | 8/1990 | Japan . |

OTHER PUBLICATIONS

Davis, Joseph R., et al (ed.), "Metals Handbook", tenth edition vol. 1, 1990, pp. 302–304.

*Primary Examiner*—Donald P. Walsh
*Assistant Examiner*—Meena Chelliah
*Attorney, Agent, or Firm*—Nixon & Vanderhye

[57] ABSTRACT

An improved method for assembling bundles of nuclear fuel rods which reduces damage to the fuel cladding surface as the fuel rods are passed through an array of spacers. In particular, the invention prevents or greatly reduces the severity of longitudinal scratches on the fuel rods. The method uses thin-walled metallic tubes having a wall thickness of 0.003 to 0.006 inch and a yield strength in excess of 140,000 psi. The predetermined tube thickness ensures that the tube remains elastic. The tube deflects the cell springs when inserted in the spacer cells and reduces the load exerted on the fuel rods.

15 Claims, 5 Drawing Sheets

METHOD FOR PREVENTING SCRATCHES ON FUEL RODS DURING FUEL BUNDLE ASSEMBLY

This is a continuation of application Ser. No. 08/142,265, filed Oct. 25, 1993, now abandoned.

FIELD OF THE INVENTION

This invention generally relates to the assembly of nuclear fuel bundles for service in a conventional boiling water reactor (BWR). In particular, the invention relates to a method of assembling fuel bundles which reduces and minimizes damage to the assembled components.

BACKGROUND OF THE INVENTION

Fissionable fuel materials such as oxides of uranium, plutonium or thorium, and combinations thereof, are typically formed into small cylindrical slugs or pellets and housed within sealed tubes or elongated containers sometimes referred to in the art as "cladding". The cladding protects the fuel from reacting with the coolant, or any foreign matter entrained therein, and prevents escape of any fission products, which are normally highly radioactive and corrosive, from the fuel into the coolant, thereby preventing contamination of the overall system. Thus the enduring integrity of the sealed cladding housing the fissionable fuel is crucial.

Large-capacity power-generating nuclear fission reactor plants normally have several hundred sealed cladding tubes for housing fissionable fuel. To facilitate periodic refueling, which commonly is performed by replacing fractional portions of the total fuel at intervals and rearranging other fractional portions, these fuel rods or pins are conventionally assembled into bundles or groups of elements which can be handled and manipulated as a single composite unit.

The fuel rods of each bundle are held mutually parallel and spaced apart by mechanical means. A typical fuel bundle comprises, for example, an 8×8 or 9×9 array of spaced fuel rods. The cladding is usually more than 10 ft long, e.g., 14 ft, and approximately ½ inch in diameter the cladding tubes being spaced from each other by a fraction of an inch. The spacing is required to permit an ample flow of heat-removing coolant, such as water, over the full exterior surface of the cladding for effective heat transfer and thus effective reactor operation.

To inhibit the fuel rods from bowing and vibrating due to high heat and high velocities of coolant flowing thereabout, which could cause adjacent fuel rods to contact and in any case could impede or unbalance coolant flow, the fuel rods are retained in a spaced-apart array or relation by means of a plurality of spacing grids (hereinafter "spacers") positioned at intervals along the fuel rod length.

A typical spacer comprises a plurality of parallel cells which are welded to each other and to a surrounding spacer band to form a lattice of cells. Each cell receives one fuel rod. Each fuel rod passes through a plurality, e.g., seven, of spacers. These spacers are mutually aligned and spaced along the length of the fuel rods. Each spacer receives a different axial portion of the plurality of fuel rods making up the fuel bundle. The spacers provide intermediate restraint and support transverse of the fuel rods, thereby preventing lateral bowing and vibration which could damage the fuel rods or impede effective coolant flow intermediate and around each fuel rod. Spacers for securing bundles of fuel rods often incorporate spring and stop members which press against the fuel rods in metal-to-metal contact as a means of securely gripping and holding the fuel rods in position. The fuel rods additionally have their ends supported in respective sockets of upper and lower tie plates.

The fuel rod bundle assembly is also typically surrounded by an open-ended tubular fuel channel of suitable cross section, e.g., square. The fuel channel directs the flow of coolant longitudinally along the surface of the fuel rods and guides the neutron-absorbing fission control rods which reciprocate longitudinally intermediate adjacent bundles.

Structural components used within the reactor core of fissionable fuel must be fabricated from a durable metal which has a low neutron-absorbing capacity or cross section, so as not to impede the neutron-incited fission chain reaction. The preferred materials most commonly used comprise alloys of zirconium which have a neutron absorption capacity on the order of about one-fifteenth that of stainless steel. However, under certain circumstances zirconium alloys are susceptible to corrosion which can result in structural failure. To impede a destructive form of self-perpetuating corrosion peculiar to zirconium and its alloys referred to in the art as nodular corrosion, components produced from zirconium alloys, such as cladding, are commonly treated to form a specific oxide surface layer which resists nodular corrosion and surface attack under reactor conditions.

Referring to FIG. 1, a typical nuclear fuel bundle 10 comprises a group of spaced-apart, mutually parallel fuel rods 12. Each fuel rod comprises a cylindrical container 14 (i.e., cladding) which houses a vertical stack of pins or slugs of fissionable fuel (not shown) sealed therein. Each fuel rod 12 is transversely secured in the parallel array by a series of spacers 16 positioned at intervals along the length of the fuel rods. The ends of the fuel rods of each bundle are fixed within respective sockets of upper and lower tie plates 18 and 20. The bundle assembly of grouped fuel rods 12 and spacers 16 is surrounded by an open-ended fuel channel 22.

It has been determined that abrasions or damage such as scratches in the surface of metal fuel rods present potential sites for the subsequent occurrence of destructive forms of corrosion. For example, surface abrasions or scratches in zirconium alloys render the site susceptible to a form of corrosion which can result in progressive erosion when exposed to the aggressive thermal and chemical environment of a nuclear reactor fuel core. This progressive form of corrosion is called "nodular corrosion" because it occurs as a deeply penetrating area of erosion producing a white oxide surface nodule. Nodular corrosion can significantly impair the structural integrity of the zirconium alloy cladding to the degree of rendering the cladding vulnerable to rupture. Rupture of the cladding results in leakage of radioactive fission products from the fuel rod into the recirculating coolant, which carries the contaminants throughout the system, and the entry of coolant and any entrained impurities into the fuel rod and into contact with the fissionable fuel.

Evaluations have shown that surface abrasions and damage such as scratches are primarily inflicted during assembly of the fuel bundles. In particular, abrasion and scratching occurs when the spring and stop members of the spacer cells bear against the moving surface of the cladding as each fuel rod passes through successive spacers. Secondarily, abrasion and scratching can occur during preassembly handling of the cladding, e.g., if one cladding element rubs against another cladding element or contacts storage and production structural members, or during shipping and handling prior to installation in the reactor fuel core.

As each fuel rod is inserted into the series of spacers during fuel bundle assembly, the number of axial scratches increases as the fuel rod progresses through each successive spacer. Each section of fuel rod can receive a number of scratches equal to the product of the number of contact points for each spacer cell and the number of spacers the fuel rod passes through. For example, if each cell has three contact points and if the assembly has seven spacers, then the leading section of the fuel rod potentially could receive 24 scratches depending on rotation of the fuel rod.

Scratches in the surface of the cladding upset the surface topography which has been treated for optimal corrosion resistance prior to fuel bundle assembly. It is highly desirable to minimize damage to the cladding surface. However, conventional devices and methods for preventing scratches during insertion of fuel rods into spacers have various drawbacks.

It is known to coat the cladding surface with lubricants prior to insertion of the fuel rod. However, lubricants have been found to be ineffective. Varnish type coatings have also been used. Although such coatings are effective, the varnish must be removed after assembly by chemical means. Disposal of the varnish and varnish remover is expensive.

In the prior art, plastic sleeves having a longitudinal slit are inserted into the spacer cells to prevent sliding contact between the fuel rods and the spacer cells during fuel rod insertion. Individual sleeves are attached to individual holders. During fuel bundle assembly, insertion and removal of sleeves is done one rod at a time. The first fuel rod is inserted through all spacers and the sleeves are removed. Then the process is repeated for the next fuel rod. In order to remove the sleeves of last few fuel rods, the fuel rods must be inserted in the central region of the bundle first. The sleeve at each spacer is removed by sliding the sleeve longitudinally until the sleeve is clear of the spacer and then opening the sleeve to allow the fuel rod to pass radially through the expanded slit. This process increases the cost of fuel bundle assembly.

U.S. Pat. No. 4,740,351 to Katsumizu et al. discloses an arrangement which utilizes flexible sleeves to separate the fuel rods from abutting parts of the spacer cells during assembly. The protective sleeve is formed by winding flexible sheet material, the opposing edges of the sheet defining a longitudinal slit for removing the fuel rods. The sleeve material is polyester film. The sleeve has a length substantially equal to the overall length of the fuel rod. This patent also states that Japanese Patent Publication No. 11244/1978 discloses a stainless steel protecting tube about 0.1 mm thick fitted around the fuel rod.

U.S. Pat. No. 4,800,061 to Shallenberger et al. discloses a thin-walled metallic sleeve having a longitudinal slit. The sleeve serves as a protective envelope for the fuel rod during insertion of the fuel rod into the spacer cells. The sleeve has a uniform wall thickness of 0.006 to 0.008 inch and is preferably made of stainless steel.

SUMMARY OF THE INVENTION

The present invention is an improved method for assembling bundles of nuclear fuel elements which reduces damage to the fuel cladding surface as the fuel rods are passed through an array of spacers. In particular, the invention prevents or greatly reduces the severity of longitudinal scratches on the fuel rods.

The method of the invention uses thin-walled tubes having an inner diameter slightly greater than the fuel rod outer diameter, i.e., the clearance between the tube and the fuel rod is 0.006 to 0.012 inch. The wall thickness is 0.003 to 0.006 inch. The tube length must be at least as great as the distance from the bottom of the lowest spacer to the top of the topmost spacer. The material is a metal or alloy having a yield strength equal to or greater than about 140,000 psi.

To practice the invention, the thickness of the tube is important. The aforementioned tube dimensions were set so that the tube remains elastic. It is also important that the protective tube have no longitudinal slit. These features ensure that the tube will deflect the cell springs when inserted in the spacer cells and reduce the load exerted on the fuel rods.

In one version of the method of the invention, the thin-walled tube is inserted through all the spacers, and then the fuel rod is inserted into the tube. In another version of the method, the fuel rod is first inserted into the tube, and then the tube and fuel rod are inserted through the spacers. In both cases the final step is pulling the tube out of the assembly while holding the fuel rod in place.

BRIEF DESCRIPITON OF THE DRAWINGS

DETAILED DESCRIPTION OF THE PREFERRED EMBODIMENTS

Figure 1:
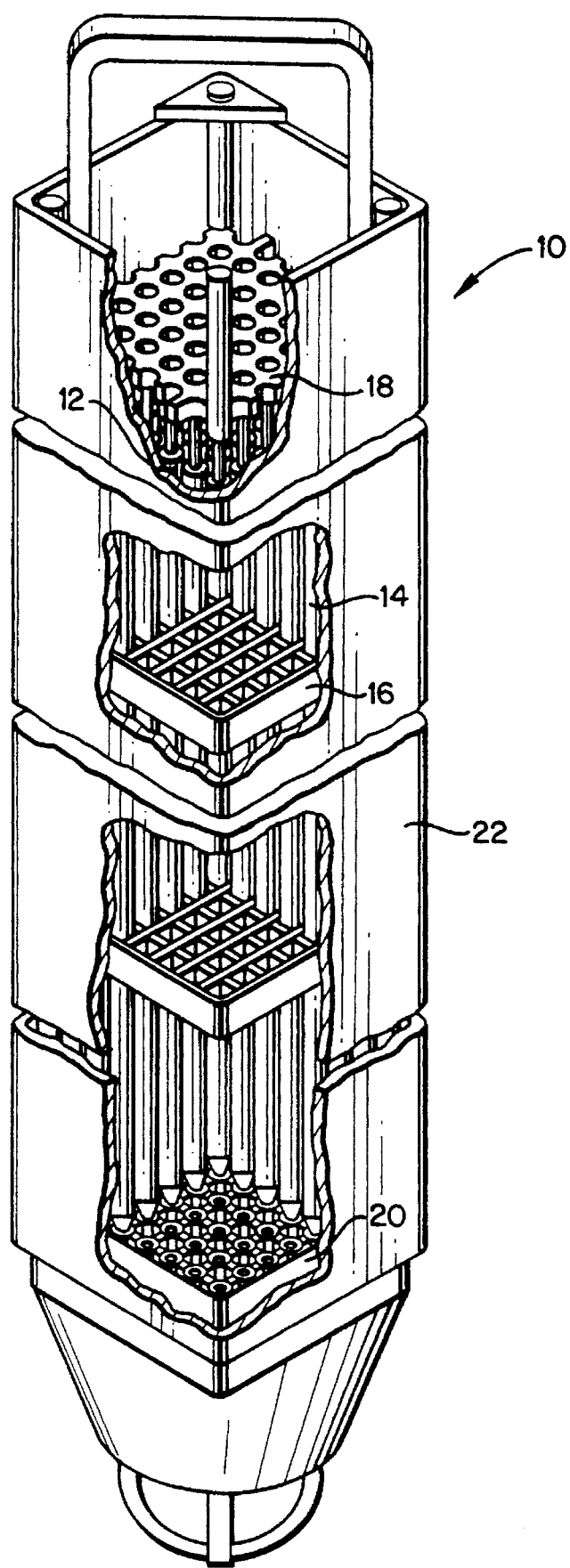
FIG. 1 is a perspective view, partly in section and not to scale, of a nuclear fuel bundle assembly.
Figure 2:
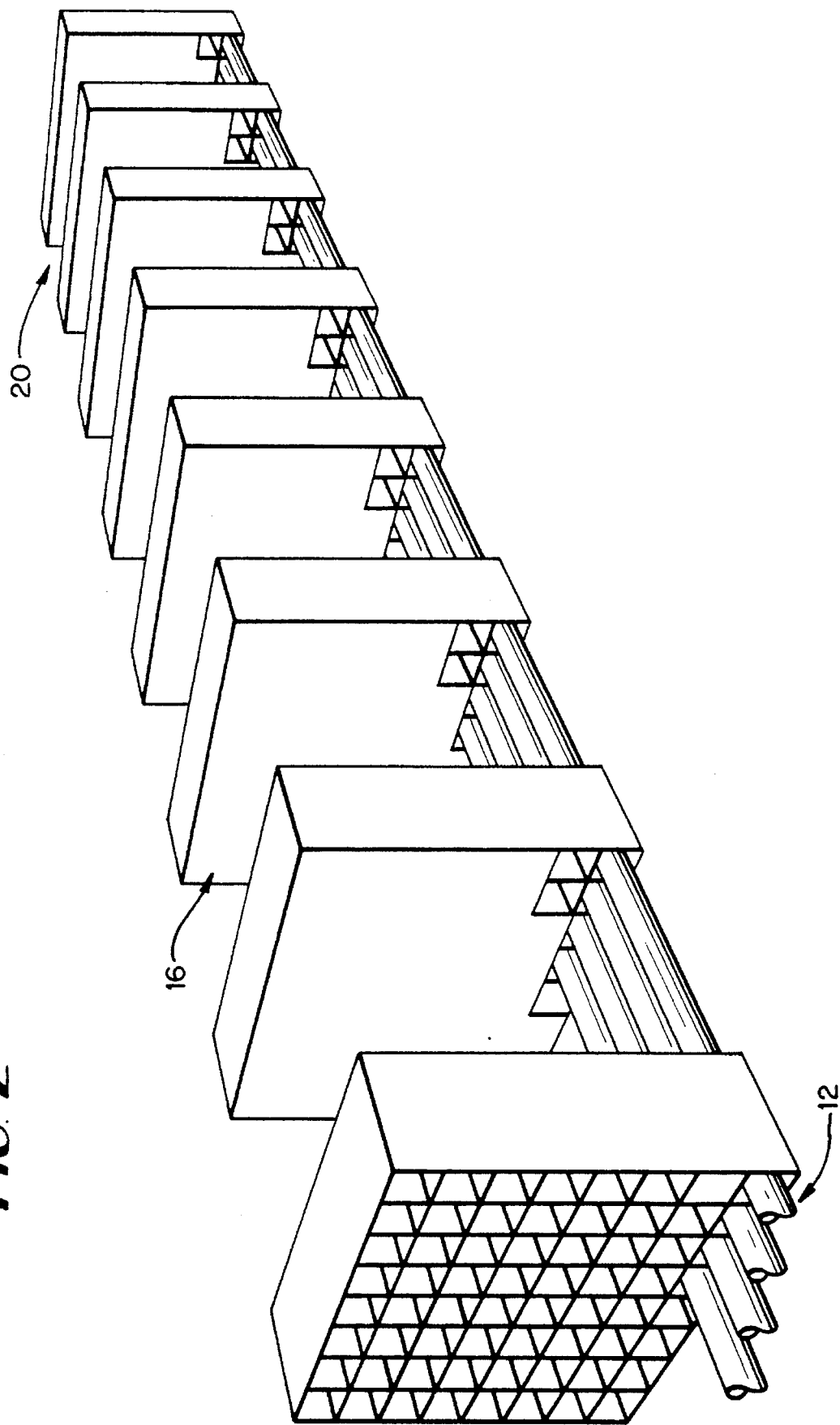
FIG. 2 is a diagram showing a partially assembled nuclear fuel bundle in accordance with a conventional assembly procedure.

FIG. 2 illustrates the current fuel bundle assembly procedure. The spacers 16 and lower tie plate 20 are set up on a table with the correct axial spacing. Then fuel rods 12 are inserted, one at a time, horizontally through the spacers 16 into the lower tie plate 20.

Figure 3:
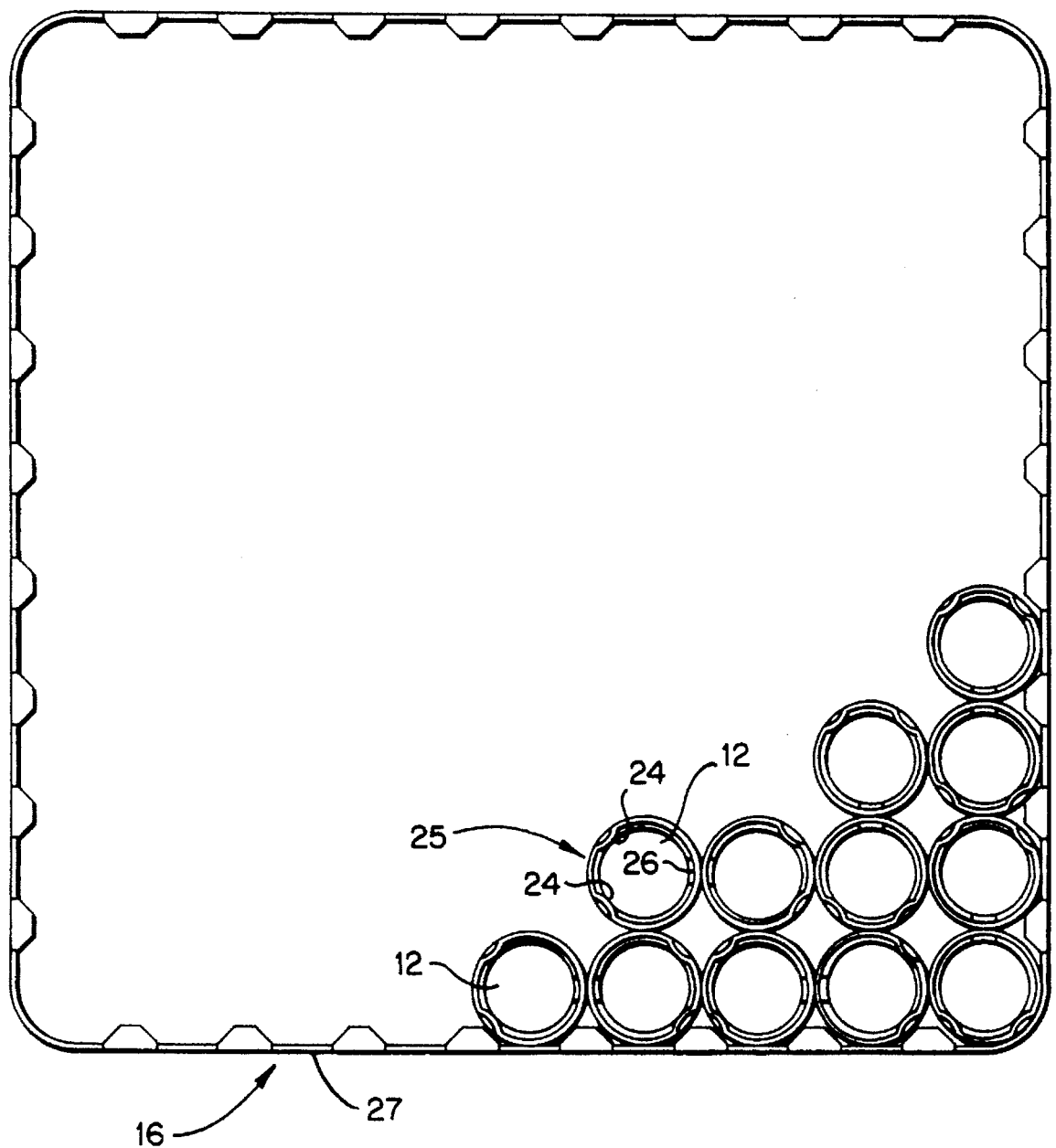
FIG. 3 is a top view showing less than all of the spacer cells of a typical spacer.

FIG. 3 shows a top view of a typical spacer 16 comprising a plurality of parallel cells 25 welded to each other and to a spacer band 27 to form a lattice or grid. Less than all of the cells 25 are shown for the sake of convenience.

Figure 4A:
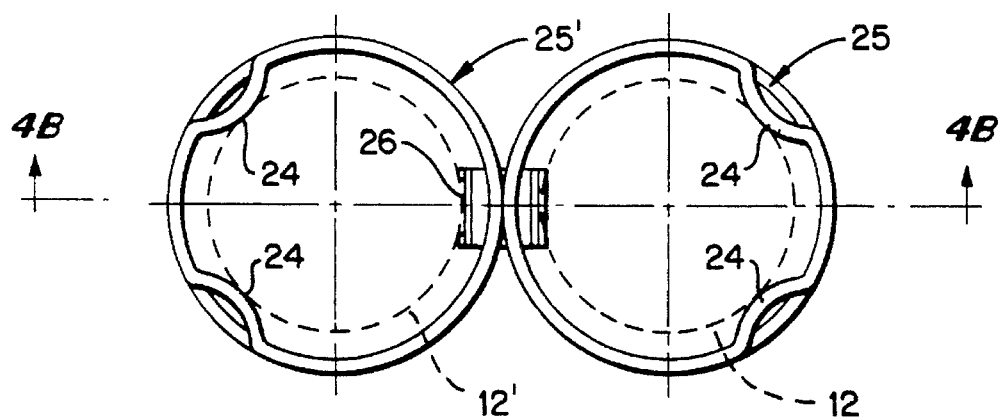
FIGS. 4A and 4B are top and elevation views respectively of paired spacer cells having a common spring.
Figure 4B:
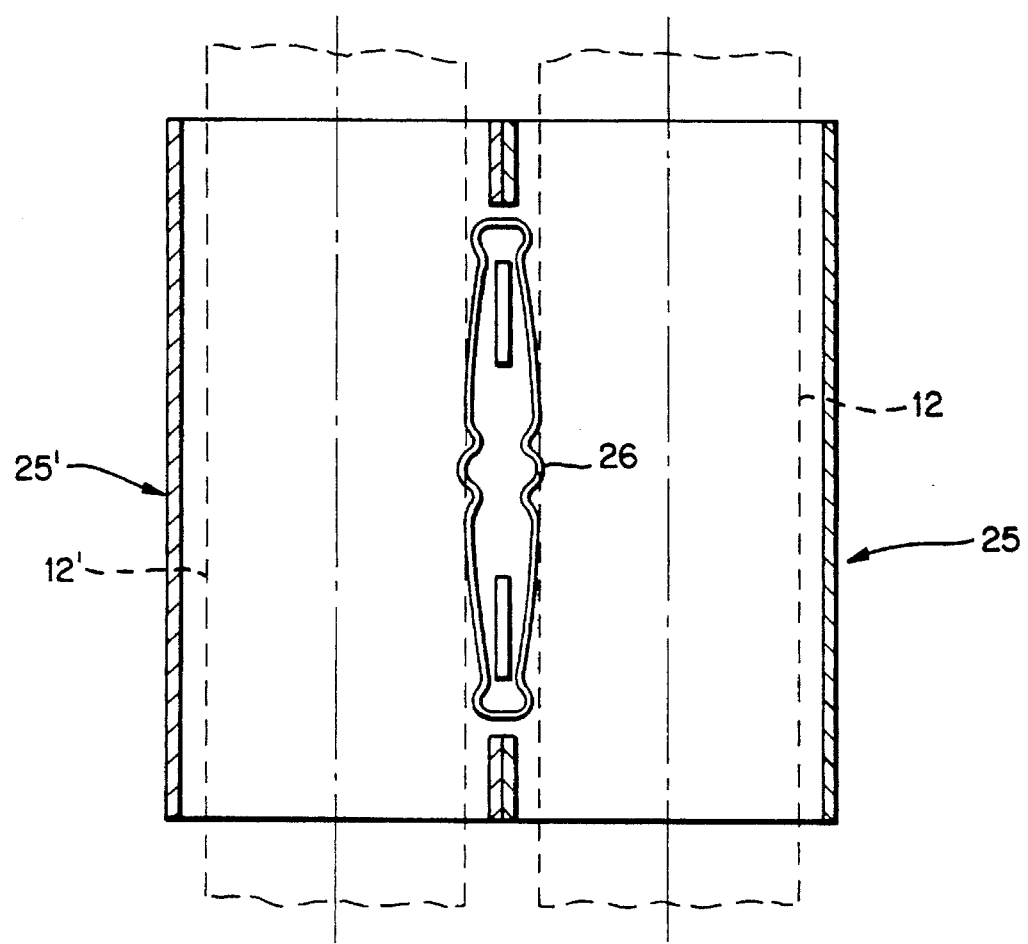

As best seen in FIGS. 4A and 4B, each pair of adjacent spacer cells 25 and 25' are linked by a common spring 26 which biases fuel rods 12 and 12' in opposite directions toward a respective set of stops 24. In the absence of an intervening means for deflecting the spring, the spring will be deflected by sliding contact with the fuel rod. The interference between spring 26 and the fuel rods 12 and 12' is best seen in FIG. 4B. The spring 26 exerts a force of several pounds on the surface of each fuel rod during this sliding contact.

In the absence of a protective envelope, the sliding contact of the fuel rod with spring 26 and stops 24 will cause longitudinal scratches on the cladding surface. The method of the present invention prevents the formation of longitudinal scratches on the Zircaloy fuel cladding surfaces while introducing minimal complications in the assembly process.

Figure 5:
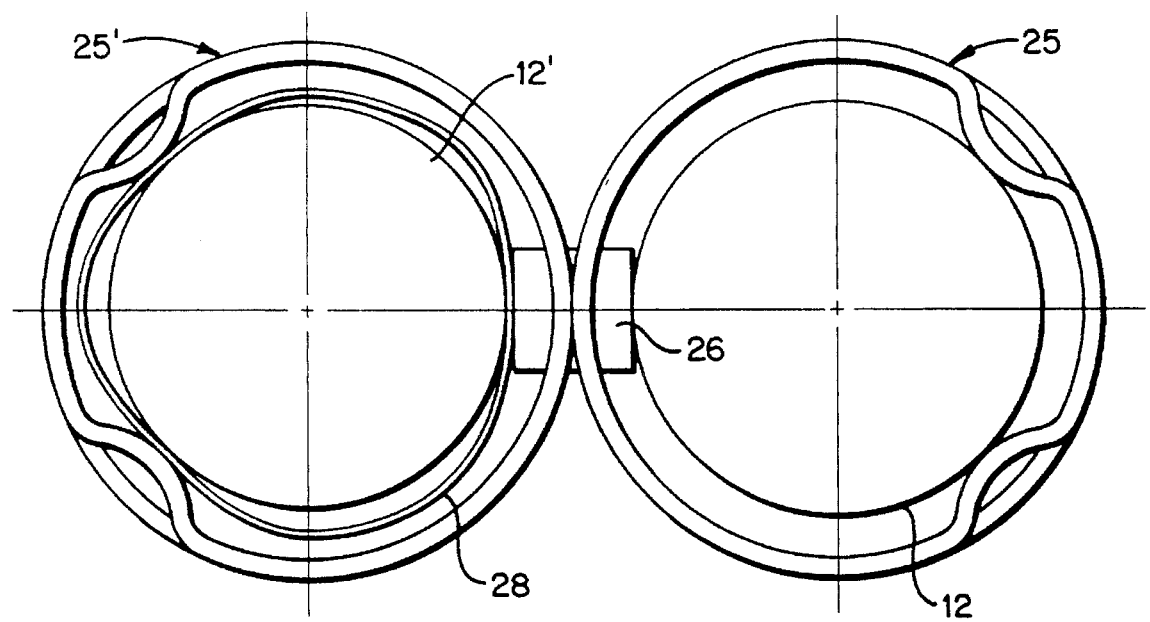
FIG. 5 is a top view showing loaded spacer cells with and without a thin-walled tube in accordance with the method of the invention.
Figure 6:
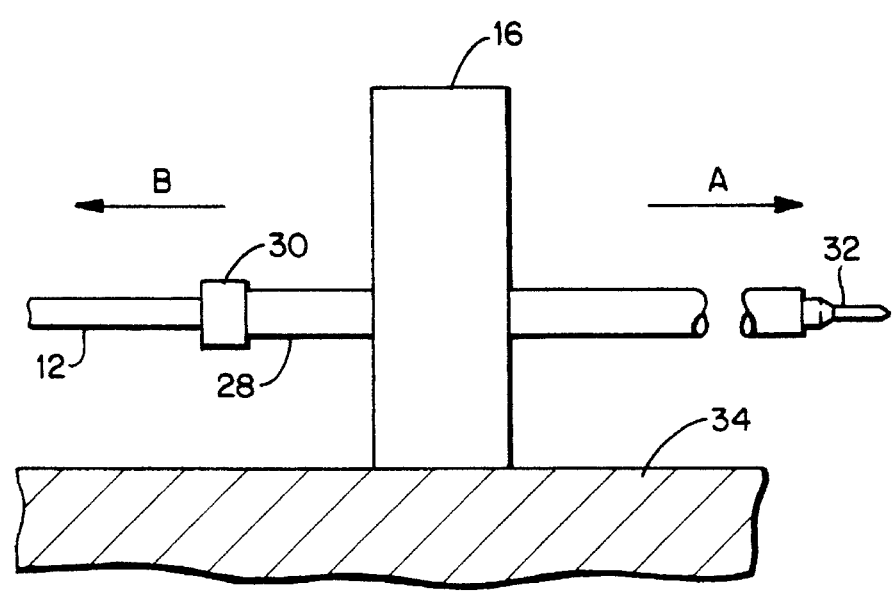
FIG. 6 is a diagram illustrating the steps of the method in accordance with the invention.

The basic principle of the invention is illustrated in FIGS. 5 and 6. An elastic thin-walled metallic tube 28 is arranged between the fuel rod 12' and the cell 25' during insertion of the fuel rod. As shown in FIG. 5, the load exerted by the spring 26 causes the elastic tube 28 to deflect at the points of contact with spring 26 and stops 24. However, the resistance to deformation of elastic tube 28 also causes the spring 26 to deflect.

The prevention or reduction in scratching resulting from use of the invention occurs by two mechanisms. First, the tube reduces the load transmitted from the spring to the fuel rod, and second, the tube distributes the load over a greater area of the fuel rod.

The space available for the tube is limited. If there were a large space available, the tube could have an inner diameter considerably larger than the fuel rod outer diameter. However, under worst case tolerances, the largest diameter which will pass through the stops and fully deflected spring of a cell is only about 0.015 inch greater than the fuel rod outer diameter. Therefore the tube must be thin-walled and flexible so that it can deform and pass through the cells. Based on a worst case combination of tolerances, the diameter of the internal surface of the tube must be 0.006 to 0.012 inch greater than the outer diameter of the fuel rod. The typical fuel rod has an outer diameter in the range of 0.38 to 0.48 inch.

The tube thickness is important because the metallic tube must be elastic. To ensure that the metallic tube is elastic, the tube wall thickness must be in the range of 0.003 to 0.006 inch. The tube is made from a metal or alloy having a very high yield strength without permanent deformation, i.e., a yield strength equal to or greater than about 140,000 psi, so that it will remain elastic under the spacer spring forces. Due to this elasticity, the spring 26 is deflected away from the fuel rod. At the same time the tube deflects at the spring and stop locations, as seen in FIG. 5. The preferred materials for the elastic tube are high-temperature alloys such as Inconel X-750 (73% Ni, 15% Cr, 6.75% Fe) and Inconel 718 (52.5% Ni, 18.6% Cr, 18.5% Fe).

As a consequence of the foregoing, the tube absorbs all or part of the spring force. For spacer locations with nominal dimensions, the tube takes all or most of the spring load. The tube deflection may not take up all the gap between the fuel and the tube. For worst case spacer dimensions, the tube will be deflected to take up all the gap and some of the spring force will be transmitted to the fuel rod. However, in that case the tube serves to distribute the load transmitted by the spring over a larger surface area of the fuel rod.

The preferred sequence of steps in accordance with the invention will be described with reference to FIG. 6, which shows one spacer 16 of an array of spacers placed atop a table 34. The spacers are arranged on their sides at intervals corresponding to the spacer intervals in the final assembly.

The first step is to pull the tube 28 through a corresponding cell of each spacer in sequence in the direction indicated by arrow A. Next the fuel rod 12 is inserted in the tube 28. This is accomplished by holding tube 28 at the end at which the fuel rod enters. A ring 30 is secured to tube 28 for this purpose. While holding ring 30 to prevent displacement in direction A, the fuel rod 12 is pulled through tube 28 in direction A by gripping end plug 32, which is welded to the fuel cladding. As a result, the tube and fuel rod are in tension as the fuel rod slides through the tube, thereby avoiding buckling of either the tube or the fuel rod.

Tube 28 is withdrawn by gripping ring 30 and pulling in direction B while holding end plug 32, thereby preventing longitudinal displacement of the fuel rod as the tube is slid out. Thus, the tube and fuel rod are also in tension during tube withdrawal, again avoiding buckling of either the tube or the fuel rod.

To obtain even greater protection against scratching, a lubricant can be used between the tube and the fuel rod. Lubricant inside the tube will be far more effective than lubricant on a bare fuel rod, since the forces exerted on the fuel rod by the spacer springs are smaller and are distributed over a greater area. In addition, the lubricant is confined in the small gap between the fuel rod and the tube.

Instead of inserting the tube and the fuel rod in the spacers in separate operations, the tube and fuel rod can be inserted together in the same operation, with the fuel rod already nestled inside the tube.

We claim:

1. A method for preventing scratching of nuclear fuel rod surfaces during fuel bundle assembly, comprising the steps of:

standing a first spacer on its side atop a support surface, said first spacer having a first cell;

standing a second spacer on its side atop said support surface spaced from said first spacer by an interval, said second spacer having a first cell which is aligned with said first cell of said first spacer;

passing a leading end of a circumferentially continuous metal or alloy tube through said first cells of said first and second spacers and then stopping said tube in a temporary position such that a first portion of said tube is seated in said first cell of said first spacer and a second portion of said tube is seated in said first cell of said second spacer, wherein said tube is made of metal or alloy having a yield strength equal to at least about 140,000 psi, and said tube has a wall thickness of 0.003 to 0.006 inch and a length greater than said interval;

sliding a fuel rod inside said tube; and removing said tube while holding said fuel rod in place.

2. The method as defined in claim 1, wherein said tube is made of a high-temperature nickel-based alloy.

3. The method as defined in claim 1, wherein said fuel rod is slid into said tube after said tube is passed through said first cells of said first and second spacers.

4. The method as defined in claim 1, wherein said fuel rod is slid into said tube before said tube is passed through said first cells of said first and second spacers.

5. The method as defined in claim 1, wherein said fuel rod is pulled through said tube by application of a force in a first longitudinal direction while said tube is held in place by application of a force in a second longitudinal direction, said second longitudinal direction being opposite to said first longitudinal direction.

6. The method as defined in claim 1, wherein said tube is pulled out by application of a force in a first longitudinal direction while said fuel rod is held in place by application of a force in a second longitudinal direction, said second longitudinal direction being opposite to said first longitudinal direction.

7. The method as defined in claim 1, wherein said tube has an internal diameter which is greater than the outer diameter of said fuel rod by 0.006 to 0.012 inch.

8. The method as defined in claim 1, wherein the internal surface of said tube is coated with lubricant.

9. The method as defined in claim 1, wherein said first cells each have a spring and two stops which bear against said tube, said tube being deflected radially inward at the points of contact with said spring and said stops.

10. The method as defined in claim 9, wherein said tube is sufficiently elastic to deflect said spring radially outward upon insertion of said tube.

11. A nuclear fuel bundle assembly, comprising:

a first spacer having a first cell;

a second spacer spaced apart from said first spacer by an interval, said second spacer having a first cell which is aligned with said first cell of said first spacer;

a circumferentially continuous tube made of metal or alloy having a yield strength equal to at least about 140,000 psi, said tube having a wall thickness of 0.003 to 0.006 inch and a length greater than said interval and having first and second portions temporarily seated in said first cells of said first and second spacers respectively; and a fuel rod seated inside said tube.

12. The nuclear fuel bundle assembly as defined in claim 11, wherein said tube is made of a high-temperature nickel-based alloy.

13. The nuclear fuel bundle assembly as defined in claim 11, wherein said tube has an internal diameter which is greater than the outer diameter of said fuel rod by 0.006 to 0.012 inch.

14. A protective tube made of metal or alloy having a yield strength equal to at least about 140,000 psi and having a wall thickness of 0.003 to 0.006 inch.

15. The protective tube as defined in claim 14, wherein said tube is made of a high-temperature nickel-based alloy.

* * * * *